US012084946B2

(12) United States Patent
Li et al.

(10) Patent No.: US 12,084,946 B2
(45) Date of Patent: Sep. 10, 2024

(54) MONITORING SYSTEM AND METHOD FOR WELLSITE EQUIPMENT

(71) Applicant: YANTAI JEREH PETROLEUM EQUIPMENT & TECHNOLOGIES CO., LTD., Yantai Shandong (CN)

(72) Inventors: Liang Li, Yantai Shandong (CN); Shouzhe Li, Yantai Shandong (CN); Zhuqing Mao, Yantai Shandong (CN); Jun Zhang, Yantai Shandong (CN); Kaishen Liu, Yantai Shandong (CN); Pengyuan Zhang, Yantai Shandong (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 643 days.

(21) Appl. No.: 17/321,607

(22) Filed: May 17, 2021

(65) Prior Publication Data

US 2022/0259947 A1 Aug. 18, 2022

(30) Foreign Application Priority Data

Feb. 18, 2021 (CN) ......................... 202110190403.7
Feb. 18, 2021 (CN) ......................... 202120378143.1

(51) Int. Cl.
*E21B 41/00* (2006.01)
*G01K 1/02* (2021.01)
(Continued)

(52) U.S. Cl.
CPC .......... *E21B 41/00* (2013.01); *E21B 41/0021* (2013.01); *G01K 1/022* (2013.01);
(Continued)

(58) Field of Classification Search
CPC ..... E21B 41/00; E21B 41/0021; G06V 20/41; G01K 1/022; G01K 3/005; G01K 3/06;
(Continued)

(56) References Cited

U.S. PATENT DOCUMENTS 4,408,224 A * 10/1983 Yoshida ........... G08B 13/19602 348/222.1
4,823,290 A * 4/1989 Fasack ................ G06F 11/3058 714/48
(Continued)

FOREIGN PATENT DOCUMENTS

CN 105484796 A 4/2016
CN 105484798 A 4/2016
(Continued)

OTHER PUBLICATIONS

International Search Report dated Nov. 2, 2021, for International Application No. PCT/CN2021/090031, 4 pages.
(Continued)

*Primary Examiner* — Randy W Gibson
(74) *Attorney, Agent, or Firm* — Sheppard Mullin Richter & Hampton LLP

(57) ABSTRACT

The present disclosure relates to a monitoring system and method for wellsite equipment, used for monitoring abnormities in the monitoring area of wellsite equipment, wherein the monitoring system for wellsite equipment comprises:

a dynamic capturing module comprising a video acquisition unit and a dynamic analysis unit, wherein, the video acquisition unit acquires video signals in the monitoring area of wellsite equipment, and the motion analysis unit analyzes and determines whether there is abnormal dynamic activity in the monitoring area of wellsite equipment based on acquired video signals;

a temperature detection module comprising a temperature acquisition unit and a temperature analysis unit, (Continued)

Monitoring System for Wellsite Equipment 100
Dynamic Capturing Module 10
Video Acquisition Unit 11
Dynamic Analysis Unit 12
Video Signal Repository 13
Display Unit 50
Temperature Detection Module 20
Temperature Acquisition Unit 21
Temperature Analysis Unit 22
Temperature Information Repository 23
Information Processing Module 30
Alarm Module 40

S1 Acquire Video Signal of Monitoring Area
S2 Determine Whether There Is Abnormal Activity
S3 Acquire Temperature Distribution of Monitoring Area
S4 Obtain Temperature Information
S5 Determine Whether There Is Temperature Anomaly
S6 Determine Fault Type wherein the temperature acquisition unit acquires temperature distribution in the monitoring area of wellsite equipment, and the temperature analysis unit analyzes and obtains temperature information in the monitoring area of wellsite equipment based on acquired temperature distribution, and determines whether there is temperature anomaly in the monitoring area of wellsite equipment based on the temperature information; and an information processing module configured to determine type of fault in the monitoring area of wellsite equipment based on considering the abnormal dynamic activity and the temperature anomaly separately or both.

20 Claims, 2 Drawing Sheets

(51) Int. Cl.

| | |
|---|---|
| ***G01K 1/022*** | (2021.01) |
| ***G01K 3/00*** | (2006.01) |
| ***G01K 3/06*** | (2006.01) |
| ***G01K 3/08*** | (2006.01) |
| ***G06V 20/40*** | (2022.01) |
| ***G08B 3/10*** | (2006.01) |
| ***G08B 21/18*** | (2006.01) |
| *G01K 3/14* | (2006.01) |

(52) U.S. Cl.
CPC ............... *G01K 3/005* (2013.01); *G01K 3/06* (2013.01); *G01K 3/08* (2013.01); *G06V 20/41* (2022.01); *G08B 3/10* (2013.01); *G08B 21/182* (2013.01); *G01K 2003/145* (2013.01)

(58) Field of Classification Search
CPC ...... G01K 3/08; G01K 2003/145; G08B 3/10; G08B 21/182
USPC .......................................................... 374/124
See application file for complete search history.

(56) References Cited

U.S. PATENT DOCUMENTS

| | | | | |
|---|---|---|---|---|
| 4,963,742 | A | 10/1990 | Abernathy | |
| 4,999,614 | A * | 3/1991 | Ueda | G08B 13/194 340/567 |
| 5,133,605 | A * | 7/1992 | Nakamura | G08B 13/194 374/129 |
| 5,294,198 | A * | 3/1994 | Schlagheck | G01N 25/72 374/126 |
| 10,685,231 | B2 * | 6/2020 | Sugaya | G01N 21/84 |
| 10,690,644 | B2 * | 6/2020 | Sugaya | G06T 7/90 |

FOREIGN PATENT DOCUMENTS

| | | | |
|---|---|---|---|
| CN | 109612757 | A | 4/2019 |
| CN | 209088980 | U | 7/2019 |
| CN | 110631624 | A | 12/2019 |
| CN | 111313541 | A | 6/2020 |

OTHER PUBLICATIONS

First Search for Chinese Application No. 202110190403.7 mailed on May 10, 2023.

* cited by examiner

MONITORING SYSTEM AND METHOD FOR WELLSITE EQUIPMENT

CROSS-REFERENCE TO RELATED APPLICATIONS

This application claims priority to Chinese Patent Application No. 202110190403.7, filed on Feb. 18, 2021, and Chinese Patent Application No. 202120378143.1, filed on Feb. 18, 2021. All of the above-referenced applications are hereby incorporated by reference in their entirety.

FIELD

The present disclosure relates to the field of fault monitoring for wellsite equipment. Specifically, the present disclosure relates to a monitoring system and method for wellsite equipment, used for monitoring abnormities in the monitoring area of wellsite equipment.

BACKGROUND

During the wellsite operation, in order to ensure safe operations of wellsite equipment used in fracturing construction process, it is necessary to arrange designated inspectors to conduct patrol inspections for wellsite equipment as well as pipelines in an operating wellsite so as to detect abnormities or dangers such as abnormities of wellsite equipment and shake or piercing of manifold in time. In some wellsite, the abnormities of wellsite equipment may likely lead to relatively serious safety accidents, thereby posing great risk to safety of the inspectors.

In order to reduce dangers encountered by the inspectors during equipment patrol inspections, video monitoring technology has been gradually applied to monitor abnormities of wellsite equipment. Video monitoring for key components and lines including fracturing equipment, wellheads, manifolds or engines, gearboxes, motors, transformers, frequency converters, and power supply cables can be carried out by installing an appropriate number of camera systems at proper locations in the wellsite. The video signals generated during this process can, for example, be transmitted to instrumentation or a monitoring room, such that the inspector can conduct real-time patrol inspections for important equipment, important areas or key components of the wellsite via the instrumentation or in the monitoring room.

However, the foregoing video monitoring system relies heavily on the inspector with his/her experience to monitor and detect abnormities or malfunctions of the equipment. Meanwhile, since that there might be too many screens to monitor, the inspector may miss some abnormities or misjudge fault types.

SUMMARY

The objective of the present disclosure is to provide a monitoring system and method for wellsite equipment which can perform intelligent monitor malfunctions of wellsite equipment efficiently with reducing labor costs at the same time.

According to a first aspect of the present disclosure, there is provided a monitoring system for wellsite equipment, used for monitoring abnormities in a monitoring area of wellsite equipment, comprising:

a dynamic capturing module comprising a video acquisition unit and a dynamic analysis unit, wherein, the video acquisition unit acquires video signals in the monitoring area of wellsite equipment, and the dynamic analysis unit analyzes and determines whether there is abnormal dynamic activity in the monitoring area of wellsite equipment based on acquired video signals;

a temperature detection module comprising a temperature acquisition unit and a temperature analysis unit, wherein the temperature acquisition unit acquires temperature distribution in the monitoring area of wellsite equipment, and the temperature analysis unit analyzes and obtains temperature information in the monitoring area of wellsite equipment based on acquired temperature distribution, and determines whether there is temperature anomaly in the monitoring area of wellsite equipment based on the temperature information; wherein the temperature information includes a highest temperature and/or a lowest temperature and/or an average temperature, as well as specific positions in the monitoring area of wellsite equipment corresponding to the highest temperature and/or the lowest temperature; and an information processing module configured to determine fault type in the monitoring area of wellsite equipment based on considering the conclusion of the abnormal dynamic activity from the dynamic capturing module and the conclusion of the temperature anomaly from the temperature detection module separately or both and output corresponding signals.

Optionally, in some embodiments of the present disclosure, with respect to the dynamic capturing module, the dynamic analysis unit calculates pixels of currently acquired video signal and determines there is abnormal dynamic activity when the pixels of the currently acquired video signal exceed a preset threshold of pixel.

Optionally, in some embodiments of the present disclosure, the preset threshold of pixel is determined with reference to video pixels in the monitoring area of wellsite equipment under normal operations.

Optionally, in some embodiments of the present disclosure, the dynamic capturing module further comprises a video signal repository, in which the video signals acquired by the video acquisition unit are stored.

Optionally, in some embodiments of the present disclosure, the dynamic analysis unit is configured to compare currently acquired video signal with that acquired at a previous time point or at several previous time points, and then analyze a pixel change of the video signal at corresponding position, and determines there is abnormal dynamic activity at the corresponding position when the pixel change at the corresponding position exceeds a preset threshold of pixel deviation.

Optionally, in some embodiments of the present disclosure, in the temperature detection module, the temperature analysis unit is configured to determine there is temperature anomaly in the monitoring area of wellsite equipment as well as corresponding specific position where the anomaly occurs when the highest temperature and/or the lowest temperature and/or the average temperature exceed a preset corresponding threshold of temperature.

Optionally, in some embodiments of the present disclosure, the corresponding threshold of temperature is determined with reference to corresponding temperature and ambient temperature in the monitoring area of wellsite equipment under normal operations.

Optionally, in some embodiments of the present disclosure, the temperature detection module further comprises a temperature information repository, in which the temperature information analyzed by the temperature analysis unit is stored.

Optionally, in some embodiments of the present disclosure, the temperature analysis unit compares currently acquired highest temperature and/or lowest temperature and/or average temperature with that acquired at a previous time point or at several previous time points stored in the temperature information repository, and determines the temperature anomaly in the monitoring area of wellsite equipment when a corresponding temperature difference exceeds a preset threshold of temperature deviation.

Optionally, in some embodiments of the present disclosure, the information processing module further takes a relationship between a specific position of the abnormal dynamic activity and that of the temperature anomaly into consideration so as to determine the fault type.

Optionally, in some embodiments of the present disclosure, the monitoring system for wellsite equipment further comprises an alarm module configured to sound an alarm once the information processing module determines the fault type in the monitoring area of wellsite equipment.

Optionally, in some embodiments of the present disclosure, the monitoring system for wellsite equipment further comprises a display unit configured to display the acquired video signals and the temperature distribution.

According to a second aspect of the present disclosure, there is further provided a monitoring method for wellsite equipment, used for monitoring abnormities in the monitoring area of wellsite equipment, the monitoring method includes the following steps:

- acquiring video signals in the monitoring area of wellsite equipment;
- analyzing and determines whether there is abnormal activity in the monitoring area of wellsite equipment based on acquired video signals;
- acquiring temperature distribution in the monitoring area of wellsite equipment;
- analyzing and obtaining temperature information in the monitoring area of wellsite equipment based on acquired temperature distribution, wherein, the temperature information includes a highest temperature and/or a lowest temperature and/or an average temperature, as well as specific positions in the monitoring area of wellsite equipment corresponding to the highest temperature and/or the lowest temperature;
- determining whether there is temperature anomaly in the monitoring area of wellsite equipment; and
- taking both the conclusion of the abnormal dynamic activity and the conclusion of the temperature anomaly into consideration, and determining fault type in the monitoring area of wellsite equipment.

Optionally, in some embodiments of the present disclosure, when determining the abnormal dynamic activity, calculating pixels of currently acquired video signal, determining there is abnormal dynamic activity when the pixels of the currently acquired video signal exceed a preset threshold of pixel.

Optionally, in some embodiments of the present disclosure, the preset threshold of pixel is determined with reference to video pixels in the monitoring area of wellsite equipment under normal operations.

Optionally, in some embodiments of the present disclosure, the method further including when determining the abnormal activity, comparing currently acquired video signal with that acquired at a previous time point or at several previous time points, then analyzing pixel change of the video signal at the corresponding position, and determining there is abnormal dynamic activity at the corresponding position when the pixel change at the corresponding position exceeds a preset threshold of pixel deviation.

Optionally, in some embodiments of the present disclosure, when determining the temperature anomaly, determining there is temperature anomaly in the monitoring area of wellsite equipment as well as its corresponding specific position when the highest temperature and/or the lowest temperature and/or the average temperature exceed a preset corresponding threshold of temperature.

Optionally, in some embodiments of the present disclosure, the corresponding threshold of temperature is determined with reference to corresponding temperature and ambient temperature in the monitoring area of wellsite equipment under normal operation.

Optionally, in some embodiments of the present disclosure, the method further including when determining the temperature anomaly, comparing currently acquired highest temperature and/or lowest temperature and/or average temperature with that acquired at a previous time point or at several previous time points, and determining the temperature anomaly in the monitoring area of wellsite equipment when a corresponding temperature difference exceeds a preset threshold of temperature deviation.

Optionally, in some embodiments of the present disclosure, a relationship between specific position of the abnormal dynamic activity and that of the temperature anomaly is also considered to determine the fault type.

BRIEF DESCRIPTION OF THE DRAWINGS

In order to better understand the above and other objectives, features and advantages of the present disclosure, preferred embodiments as shown in the accompanied drawings are provided. Throughout the drawings, the same or similar reference signs refer to the same or similar elements. It would be appreciated by those skilled in the art that the drawings are provided to illustrate the preferred embodiments of the present disclosure, without suggesting any limitation to the scope of the present disclosure.

Figure 1:
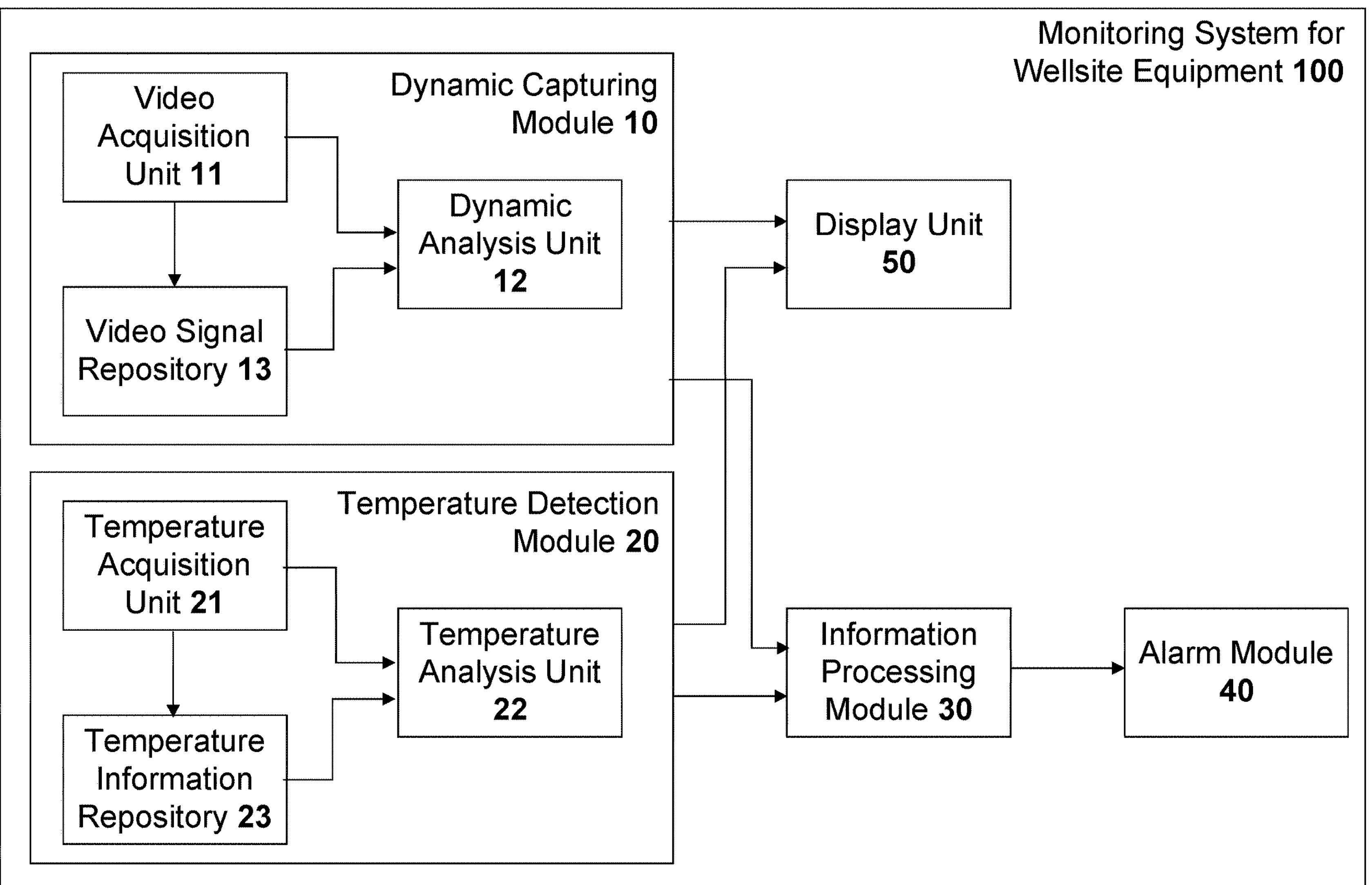
FIG. 1 exemplarily shows the structural modules of monitoring system for wellsite equipment disclosed in the present disclosure.
Figure 2:
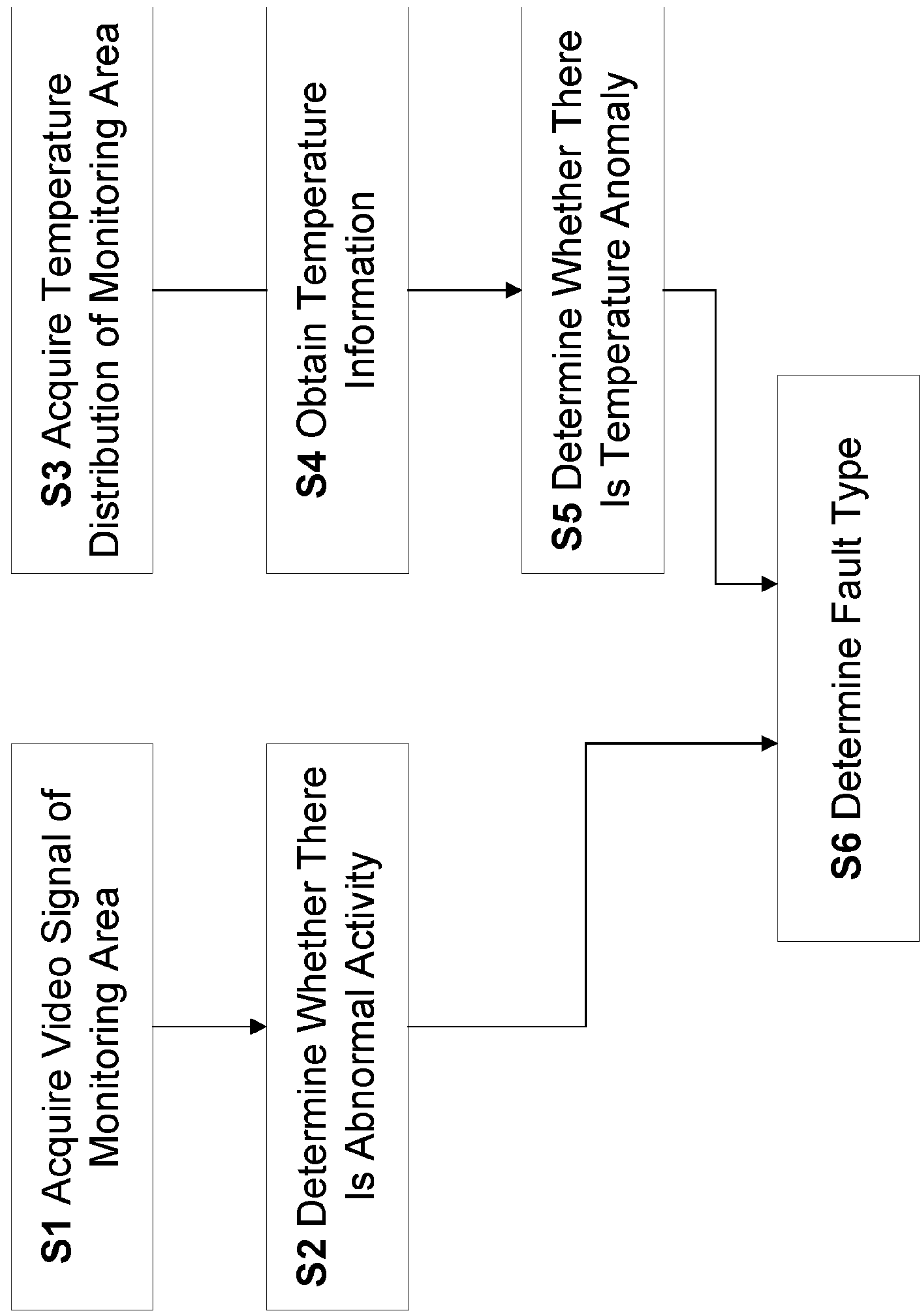
FIG. 2 exemplarily shows a flow chart of steps of the monitoring method for wellsite equipment disclosed in the present disclosure.

REFERENCE SIGNS monitoring system for wellsite equipment 100
dynamic capturing module 10
video acquisition unit 11
dynamic analysis unit 12
video signal repository 13
temperature detection module 20
temperature acquisition unit 21
temperature analysis unit 22
temperature information repository 23
information processing module 30
alarm module 40
display unit 50

DETAILED DESCRIPTION OF EMBODIMENTS

Reference will now be made to the drawings to describe in detail the embodiments of the present disclosure. The description here is only about preferred embodiments of the present disclosure, and those skilled in the art would envision, based on the preferred embodiments described herein, other manners that can implement the present disclosure, which also fall into the scope of the present disclosure.

Referring to FIG. 1, a monitoring system 100 for wellsite equipment according to the present disclosure is exemplarily shown herein. It can be seen from FIG. 1 that the monitoring system 100 for wellsite equipment may comprise: a dynamic capturing module 10 for capturing whether there is abnormal dynamic activity in the monitoring area of wellsite equipment via video information, a temperature detection module 20 for monitoring whether there is temperature abnormity through detecting temperature distribution in the monitoring area of wellsite equipment and an information processing module 30 for determining the fault type of the abnormity in the monitoring area of wellsite equipment through combining the output information of both the dynamic capturing module and the temperature detection module.

Within the scope of the present disclosure, the dynamic capturing module 10 may include a video acquisition unit 11 for acquiring video signals of the monitoring area of wellsite equipment and a dynamic analysis unit 12 for analyzing the acquired video signals. Specifically, the motion analysis unit 12 analyzes characteristic such as pixel of current video signal acquired by the video acquisition unit, for example, when the pixels of the current video signal exceed a preset threshold of pixel (of course, other analysis methods may also be adopted), it is determined that there is abnormal dynamic activity currently in the monitoring area of wellsite equipment.

In addition, the temperature detection module 20 may comprise a temperature acquisition unit 21 for acquiring temperature distribution of the monitoring area of wellsite equipment according to thermal imaging principle; and a temperature analysis unit 22 for obtaining the temperature information of the monitoring area of wellsite equipment based on the temperature distribution acquired by the temperature acquisition unit 21, thus further determining whether there is temperature anomaly based on the temperature information. Herein, the temperature information includes a highest temperature and/or a lowest temperature and/or an average temperature, as well as specific locations corresponding to the highest temperature and/or the lowest temperature in the monitoring area of wellsite equipment. Within the scope of the present disclosure, the temperature acquisition unit 21 uses thermal imaging principle or in other words, infrared probes and other equipment to acquire infrared radiation energy of measured object. In principle, there is a corresponding relationship between radiation energy and temperature, so that the difference between infrared radiation energy can be displayed by different gray levels via correlative algorithm, thus further the temperature distribution of the measured object can be displayed on the graph. On this basis, the temperature analysis unit 22 can analyze the currently acquired highest temperature and/or lowest temperature and/or average temperature of the monitoring area of wellsite equipment and, for example, the positions corresponding to the highest temperature and/or lowest temperature, thus further determining whether there is temperature anomaly currently in the monitoring area of wellsite equipment. Specifically, when the highest temperature and/or lowest temperature and/or average temperature exceed a preset corresponding temperature threshold (i.e. the current highest temperature exceeds the temperature threshold corresponding to the highest temperature, and/or the current lowest temperature exceeds the temperature threshold corresponding to the lowest temperature, and/or the current average temperature exceeds the temperature threshold corresponding to the average temperature), the temperature analysis unit 22 can determine there is temperature anomaly in the monitoring area of wellsite equipment as well as the specific positions corresponding to the temperature anomaly.

The information processing module 30 is configured to analyze and determine the abnormity, more exactly the fault type in the monitoring area of wellsite equipment, based on combining the conclusion of whether there is abnormal dynamic activity determined by the dynamic capturing module 10 and the conclusion of whether there is temperature anomaly analyzed and determined by the temperature detection module 20 in the monitoring area of wellsite equipment.

Within the scope of the present disclosure, the preset pixel threshold is determined with reference to video pixels in the monitoring area of wellsite equipment under normal operations. Similarly, the corresponding preset threshold of temperature is determined with reference to corresponding temperature and ambient temperature in the monitoring area of wellsite equipment under normal operations.

Within the scope of the present disclosure, the analysis and judgment by the information processing module 30 on the fault type specifically refers to that the information processing module 30 determines the fault type in the monitoring area of wellsite equipment according to different information respectively output by the dynamic capturing module 10 and the temperature detection module 20. Herein, in other words, when the dynamic capturing module 10 determines that there is no abnormal dynamic activity in the monitoring area of wellsite equipment while the temperature detection module 20 determines that there is temperature anomaly in the monitoring area of wellsite equipment, the information processing module 30 may, for example, form a judgment that there may be operating temperature abnormity on some equipment in the monitoring area of wellsite equipment; when the dynamic capturing module 10 determines that there is abnormal dynamic activity in the monitoring area of wellsite equipment while the temperature detection module 20 determines that there is no temperature anomaly in the monitoring area of wellsite equipment, the information processing module 30 may, for example, form a judgment that faults such as abnormal vibrations may occur on some equipment in the monitoring area of wellsite equipment; and in addition, when the dynamic capturing module 10 determines that there is abnormal dynamic activity in the monitoring area of wellsite equipment and the temperature detection module 20 determines that there is also temperature anomaly in the monitoring area of wellsite equipment, the information processing module 30 may, for example, form a judgment that the monitoring area of wellsite equipment may have been broken into or malfunctions such as piercing may occur to the pipeline of wellsite equipment. Of course, in some other embodiments of the present disclosure, the information processing module 30 can also separately determine the fault type in the monitoring area of wellsite equipment based on different information output by the motion capturing module 10 and the temperature detection module 20 respectively. In other words, the information processing module 30 can determine the fault type in the monitoring area of wellsite equipment according to the abnormal dynamic activity output by the dynamic capturing module 10 or according to the temperature anomaly information output by the temperature detection module 20, as long as one of the two is sufficient to identify the fault type.

In some embodiments of the present disclosure, the dynamic capturing module 10 may further comprise, for example, a video signal repository 13, which is configured to store a series (i.e., in time series) of video signals acquired by the video acquisition unit 11 of the dynamic capturing module 10. In this case, the dynamic analysis unit 12 compares the current video signal acquired by the video acquisition unit 11 in the monitoring area of wellsite equipment with that of a previous time point or several time points stored in the video signal repository 13, so as to determine whether there is abnormal activity in the monitoring area of wellsite equipment. For example, the dynamic analysis unit 12 can compare the currently acquired video signal with that of a previous time point or several previous time points, and analyze pixel change of the video signal at corresponding position, thus further determining abnormal dynamic activity occurs at the corresponding position when the pixel change at the corresponding position exceeds a preset threshold of pixel deviation. In other words, the dynamic analysis unit 12 can determine the specific position where abnormal activity occurs according to the position where the pixel of which exceeds the pixel deviation threshold.

In some embodiments of the present disclosure, the temperature detection module 20 may further comprise a temperature information repository 23, which is configured to store temperature information in the monitoring area of wellsite equipment at a previous time point or previous time points calculated or analyzed by the temperature analysis unit 22 (i.e. the highest temperature and/or the lowest temperature and/or the average temperature with their corresponding specific positions). The temperature analysis unit 22 is configured to obtain current highest temperature and/or lowest temperature and/or average temperature through calculating current temperature distribution in the monitoring area of wellsite equipment acquired by the temperature acquisition unit 21, and compare it with corresponding temperature information at a previous time point or several previous time points stored in the temperature information repository 23. Specifically, for example, when temperature difference between the current highest temperature and/or lowest temperature and/or average temperature and that of a previous time point or several time points exceeds a preset temperature deviation threshold, the temperature analysis unit 22 determines there is temperature anomaly in the monitoring area of wellsite equipment. Of course, when analyzing the highest temperature and/or the lowest temperature, the temperature distribution acquired by the temperature acquisition unit 21 can also be combined to determine the specific position where the temperature anomaly occurs.

In some embodiments of the present disclosure, the information processing module 30 also takes the relationship between the specific position of the abnormal dynamic activity and that of the temperature anomaly into consideration to determine the fault type. That is, for example, when the specific position of the abnormal activity coincides with the specific position of the temperature anomaly, the information processing module 30 may determine that piercing at pipelines or manifolds of the equipment occurs or someone breaks into; when there is no coincidence, abnormal vibrations of the equipment may occur and someone breaks into synchronously.

In some embodiments of the present disclosure, the monitoring system 100 for wellsite equipment may further comprise an alarm module 40, which is configured to sound an alarm once the information processing module 30 determines the fault type existed the monitoring area of wellsite equipment. In addition, the monitoring system 100 for wellsite equipment further comprises a display unit 50, which is configured to display the acquired video signals as well as the temperature distribution.

The present disclosure further relates to a monitoring method for wellsite equipment, used for monitoring abnormities in the monitoring area of wellsite equipment, including the following steps:

S1: Acquiring the video signals in the monitoring area of wellsite equipment;

S2: Analyzing and determining whether there is abnormal activity in the monitoring area of wellsite equipment based on the acquired video signals;

Specifically, through analyzing characteristics such as pixels of the currently acquired video signal, for example, when the pixels of the current video signal exceed the preset threshold of pixel (of course, other analysis methods can also be adopted), it can be determined that there is abnormal dynamic activity in the monitoring area of the wellsite equipment.

S3: Acquiring the temperature distribution in the monitoring area of wellsite equipment;

S4: Analyzing and obtaining the temperature information in the monitoring area of wellsite equipment based on the acquired temperature distribution, wherein, the temperature information includes the highest temperature and/or the lowest temperature and/or the average temperature, as well as the specific positions in the monitoring area of wellsite equipment corresponding to the highest temperature and/or the lowest temperature;

S5: Determining whether there is temperature anomaly in the monitoring area of wellsite equipment based on the temperature information;

Specifically, thermal imaging principle or in other words, infrared probes and other equipment are used to acquire the infrared radiation energy of the measured object. In principle, there is a corresponding relationship between radiation energy and temperature, so that the difference between infrared radiation energy herein can be displayed by different gray levels through correlative algorithm, and then the temperature distribution of the measured object can be displayed on the graph. On this basis, analyzing the acquired current highest temperature and/or lowest temperature and/or average temperature of the monitoring area of wellsite equipment and, for example, the positions corresponding to the highest temperature and/or lowest temperature, to determine whether there is temperature anomaly in the monitoring area of wellsite equipment currently. Specifically, for example, when the highest temperature and/or lowest temperature and/or average temperature exceed the preset corresponding temperature thresholds (i.e. the current highest temperature exceeds the temperature threshold corresponding to the highest temperature, and/or the current lowest temperature exceeds the temperature threshold corresponding to the lowest temperature, and/or the current average temperature exceeds the temperature threshold corresponding to the average temperature), it can be determined that there is temperature anomaly in the monitoring area of the wellsite equipment as well as the specific location where the temperature anomaly occur.

S6: Considering the conclusion of the abnormal dynamic activity and that of the temperature anomaly simultaneously, so as to determine the fault type in the monitoring area of wellsite equipment.

Within the scope of the present disclosure, the preset pixel threshold is determined with reference to the video pixels in the monitoring area of wellsite equipment under normal operations. Similarly, the corresponding preset threshold of temperature is determined with reference to corresponding temperature and ambient temperature in the monitoring area of wellsite equipment under normal operations.

Within the scope of the present disclosure, the analysis and judgment on the fault type specifically refers to determining the fault type in the monitoring area of wellsite equipment according to different information of the abnormal dynamic activity and the temperature anomaly information. Herein, in other words, when no abnormal dynamic activity is determined in the monitoring area of wellsite equipment while temperature anomaly is determined existing in the monitoring area of wellsite equipment, for example, it can be determined that there may be operating temperature abnormity on some equipment in the monitoring area of the wellsite equipment; when abnormal dynamic activity is determined existing in the monitoring area of wellsite equipment while no temperature anomaly is determined in the monitoring area of wellsite equipment, for example, it can be determined that faults such as abnormal vibrations may occur on some equipment in the monitoring area of wellsite equipment; and in addition, when there is both abnormal dynamic activity and temperature anomaly determined in the monitoring area of wellsite equipment, for example, it can be determined that piercing at pipelines or manifolds of the equipment is occurring or someone breaks into. Of course, in some other embodiments of the present disclosure, it is also feasible to determine the fault type separately in the monitoring area of wellsite equipment based on different information of the abnormal dynamic activity and the temperature anomaly respectively. In other words, it is feasible to determine the fault type in the monitoring area of wellsite equipment according to the abnormal dynamic activity or according to the temperature anomaly information, as long as one of the two is sufficient to determine the fault type.

In some embodiments of the present disclosure, when determining the abnormal dynamic activity, the currently acquired video signal can be compared with that of a previous time point or several previous time points, which is followed by analyzing the pixel change of the video signal at the corresponding position with further determining there is abnormal dynamic activity at the corresponding position when the pixel change at the corresponding position exceeds the preset threshold of pixel deviation. That is, the specific position where the abnormal activity occurs can be determined according to the position where the pixel of which exceeds the pixel deviation threshold.

In some embodiments of the present disclosure, when determining the temperature anomaly, the currently acquired highest temperature and/or lowest temperature and/or average temperature is compared with that of a previous time point or several previous time points, so as to determine the temperature anomaly in the monitoring area of wellsite equipment when the difference between the corresponding temperatures exceeds the preset threshold of temperature deviation. Of course, when analyzing the highest temperature and/or the lowest temperature, the acquired temperature distribution can also be combined to determine the specific position where the temperature anomaly occurs.

In some embodiments of the present disclosure, the relationship between the specific position of the abnormal dynamic activity and the specific position of the temperature anomaly is also taken into consideration to determine the fault type. Specifically, for example, when the specific position of the abnormal activity coincides with that of the temperature anomaly, it might be determined that piercing at pipelines or manifolds of the equipment is occurring or someone breaks into; when there is no coincidence, abnormal vibrations of the equipment may occur and someone breaks into synchronously.

The monitoring system and method for wellsite equipment disclosed in the present disclosure is able to carry out dynamic comparison and detection of wellsite equipment, and perform fault monitoring by combining thermal imaging with dynamic capturing for certain key parts (such as manifolds or engines prone to vibrations, etc.), and furthermore, automatically sound an alarm when a fault occurs. This monitoring method reduces labor costs of wellsite monitoring and time improves efficiency meanwhile.

The foregoing description on the various embodiments of the present disclosure has been presented to those skilled in the relevant fields for the purpose of illustration, but is not intended to be exhaustive or limited to a single embodiment disclosed herein. As aforementioned, many substitutions and variations will be apparent to those skilled in the art. Therefore, although some alternative embodiments have been described above, those skilled in the art can envision or develop other embodiments according to the present disclosure. The present disclosure is intended to cover all substitutions, modifications and variations of the embodiments described herein, as well as other embodiments falling into the spirits and scope of the present disclosure.

We claim:

1. A monitoring system for detecting abnormities in wellsite equipment in a monitoring area, the system comprising:

a dynamic capturing module comprising a video acquisition unit and a dynamic analysis unit, wherein the video acquisition unit acquires a current video signal of the monitoring area, and the dynamic analysis unit compares the current video signal with a previously acquired video signal;

a temperature detection module comprising a temperature acquisition unit and a temperature analysis unit, wherein the temperature acquisition unit comprises a thermal imaging device, the temperature acquisition unit acquires a temperature distribution of the monitoring area, and the temperature analysis unit obtains current temperature information about the monitoring area based on the temperature distribution, wherein the current temperature information comprises a highest temperature, a lowest temperature, or an average temperature in the monitoring area, and a position in the monitoring area corresponding to the highest temperature or the lowest temperature; and an information processing module that receives output of the dynamic capturing module and the temperature detection module.

2. The monitoring system of claim 1, wherein the dynamic analysis unit calculates a number of changed pixels in the current video signal and determines that there is an abnormal activity when the number of changed pixels in the current video signal is greater than a preset threshold number of pixels.

3. The monitoring system of claim 2, wherein the previously acquired video signal is a video signal of the monitoring area with wellsite equipment under normal operations.

4. The monitoring system of claim 1, wherein the dynamic capturing module further comprises a video signal repository in which the previously acquired video signal is stored.

5. The monitoring system of claim 4, wherein the dynamic analysis unit is configured to compare a pixel in the current video signal with a pixel at a corresponding position in the previously acquired video signal, and determines that there is a changed pixel in the current video signal when a change from the pixel at the corresponding position exceeds a preset threshold of pixel deviation.

6. The monitoring system of claim 1, wherein the temperature analysis unit is configured to determine that there is a temperature anomaly in the monitoring area and a corresponding position at which the temperature anomaly occurs when the highest temperature, the lowest temperature, or the average temperature exceeds a preset threshold temperature.

7. The monitoring system of claim 6, wherein the preset threshold temperature is determined with reference to a temperature of wellsite equipment under normal operations and a corresponding ambient temperature in the monitoring area.

8. The monitoring system of claim 1, wherein the temperature detection module further comprises a temperature information repository in which previously acquired temperature information is stored.

9. The monitoring system of claim 8, wherein the temperature analysis unit compares the current temperature information with the previously acquired temperature information stored in the temperature information repository, and determines that there is a temperature anomaly in the monitoring area when a difference in the highest temperature, the lowest temperature, or the average temperature exceeds a preset threshold of temperature deviation.

10. The monitoring system of claim 1, wherein the output received by the information processing module comprises information about a position of an abnormal activity and that of a temperature anomaly.

11. The monitoring system of claim 1, wherein the monitoring system further comprises an alarm module.

12. The monitoring system of claim 1, wherein the monitoring system further comprises a display unit configured to display the current video signal and the temperature distribution.

13. A method of monitoring abnormities in wellsite equipment in a monitoring area, the method comprising the following steps:

acquiring a current video signal of the monitoring area;

determining whether there is an abnormal activity in the monitoring area by comparing the current video signal with a previously acquired video signal;

acquiring a temperature distribution of the monitoring area by thermal imaging;

analyzing the temperature distribution and obtaining current temperature information of the monitoring area, wherein the current temperature information comprises a highest temperature, a lowest temperature, or an average temperature in the monitoring area, and a position in the monitoring area corresponding to the highest temperature or the lowest temperature;

determining whether there is a temperature anomaly in the monitoring area; and determining a fault type in the monitoring area, wherein the fault type comprises operating temperature abnormity, abnormal vibrations, and pierced pipelines.

14. The method of claim 13, wherein the step of determining whether there is an abnormal activity comprises calculating a number of changed pixels in the current video signal, and determining that there is an abnormal activity when a number of changed pixels in the current video signal exceeds a preset threshold number of pixels.

15. The method of claim 14, wherein the previously acquired video signal is a video signal of the monitoring area with wellsite equipment under normal operations.

16. The method of claim 13, wherein the step of determining whether there is an abnormal activity comprises comparing a pixel in the current video signal with a pixel at a corresponding position in the previously acquired video signal, and determining that there is a changed pixel in the current video signal when a change from the pixel at the corresponding position exceeds a preset threshold of pixel deviation.

17. The method of claim 13, wherein the step of determining whether there is a temperature anomaly comprises determining that there is a temperature anomaly in the monitoring area and a corresponding position where the temperature anomaly occurs when the highest temperature, the lowest temperature, or the average temperature exceeds a preset threshold temperature.

18. The method of claim 17, wherein the threshold temperature is determined with reference to a temperature of wellsite equipment under normal operations and a corresponding ambient temperature in the monitoring area.

19. The method of claim 13, wherein the step of determining whether there is a temperature anomaly comprises comparing the current temperature information with previously acquired temperature information, and determining that there is a temperature anomaly in the monitoring area when a difference in the highest temperature, the lowest temperature, or the average temperature exceeds a preset threshold of temperature deviation.

20. The method of claim 13, wherein the step of determining a fault type comprises determining if there is coincidence in position between the abnormal activity and the temperature anomaly.

* * * * *